US007009626B2

(12) United States Patent
Anwar (10) Patent No.: US 7,009,626 B2
(45) Date of Patent: Mar. 7, 2006

(54) SYSTEMS AND METHODS FOR GENERATING VISUAL REPRESENTATIONS OF GRAPHICAL DATA AND DIGITAL DOCUMENT PROCESSING

(75) Inventor: Majid Anwar, Glasgow (GB)

(73) Assignee: PIcsel Technologies Limited, Glasgow (GB)

( * ) Notice: Subject to any disclaimer, the term of this patent is extended or adjusted under 35 U.S.C. 154(b) by 255 days.

(21) Appl. No.: 09/835,483

(22) Filed: Apr. 16, 2001

(65) Prior Publication Data

US 2001/0032221 A1 Oct. 18, 2001

(30) Foreign Application Priority Data

Apr. 14, 2000 (GB) .................................... 0009129

(51) Int. Cl.
*G09G 5/00* (2006.01)
(52) U.S. Cl. ....................................... 345/660; 345/666
(58) Field of Classification Search ................. 345/660, 345/666
See application file for complete search history.

(56) References Cited

U.S. PATENT DOCUMENTS

| 5,083,262 A | 1/1992 | Haff |
| 5,390,320 A | 2/1995 | Smithline |
| 5,754,348 A | 5/1998 | Soohoo |
| 5,867,166 A | 2/1999 | Schick et al. |

(Continued)

FOREIGN PATENT DOCUMENTS

EP 0 438 194 A 7/1991

(Continued)

OTHER PUBLICATIONS

Blumberg, et. al., "Visual Realism and Interactivity for the Internet", Proceedings of IEEE Compcon, 1997, San Jose, Feb. 23-26, 1997, Los Alamitos, IEEE Comp. Soc. Press, Feb. 1997, pp. 269-273.

(Continued)

*Primary Examiner*—Sumati Lefkowitz
*Assistant Examiner*—Motilewa Good-Johnson
(74) *Attorney, Agent, or Firm*—Fish & Neave IP Group Ropes & Gray LLP (57) ABSTRACT

Systems and methods for generating visual representations of graphical data and digital document processing, including:

A method of redrawing a visual display of graphical data whereby a current display is replaced by an updated display, comprising, in response to a redraw request, immediately replacing the current display with a first approximate representation of the updated display, generating a final updated display, and replacing the approximate representation with the final updated display.

A method of generating variable visual representations of graphical data, comprising dividing said graphical data into a plurality of bitmap tiles of fixed, predetermined size, storing said tiles in an indexed array and assembling a required visual representation of said graphical data from a selected set of said tiles.

A method of processing a digital document, said document comprising a plurality of graphical objects arranged on at least one page, comprising dividing said document into a plurality of zones and, for each zone, generating a list of objects contained within and overlapping said zone.

Digital document processing systems adapted to implement the methods.

31 Claims, 8 Drawing Sheets

U.S. PATENT DOCUMENTS

| | | | |
|---|---|---|---|
| 5,910,805 A | 6/1999 | Haschart et al. | |
| 5,911,066 A | 6/1999 | Atkinson et al. | |
| 5,966,465 A | 10/1999 | Keith et al. | |
| 6,014,142 A | 1/2000 | LaHood | |
| 6,034,700 A | 3/2000 | Nickell et al. | |
| 6,323,878 B1 | 11/2001 | Haffey et al. | |
| 6,333,752 B1 | 12/2001 | Hasegawa et al. | |
| 6,339,434 B1 | 1/2002 | West et al. | |
| 6,545,687 B1 * | 4/2003 | Scott et al. | 345/629 |
| 6,621,501 B1 * | 9/2003 | Morrison | 345/660 |
| 6,747,680 B1 | 6/2004 | Igarashi et al. | |
| 2004/0160458 A1 | 8/2004 | Igarashi et al. | |

FOREIGN PATENT DOCUMENTS

| | | |
|---|---|---|
| EP | 0 465 250 | 1/1992 |
| EP | 0 479 496 A | 4/1992 |
| EP | 0 513 584 A | 11/1992 |
| EP | 529 121 A | 3/1993 |
| EP | 0 753 832 A | 1/1997 |
| EP | 0 860 769 A | 1/1997 |
| EP | 0 764 918 A | 3/1997 |
| EP | 0 949 571 A2 | 10/1999 |
| GB | 2 313 277 A | 11/1997 |
| WO | WO 97/34240 | 9/1997 |
| WO | WO 98/10356 | 3/1998 |
| WO | WO 98 37506 A | 8/1998 |
| WO | WO 99 10840 A | 3/1999 |
| WO | WO 00 10372 A | 3/2000 |

OTHER PUBLICATIONS

Rowe, J.H., "Metafiles and Computer Graphics", Computers and Graphics, Pergamon Press, Ltd. Oxford, Great Britain, vol. 10, No. 2, 1986, pp. 103-106.

Heng, C. L. Image Compression: JPEG with Emphasis on "Baseline" Lossy JPEG, Progressive & Motion-JPEG. Retrieved from http://pascalzone.amirmelamed.co.il/Graphics/JPEG/JPEG.htm on Apr. 21, 2004.

Bederson, B. et al. Pad++: A Zoomable Graphical Sketchpad for Exploring Alternate Interface Physics. Journal of Visual Languages and Computing, 7:3-31 (1996).

* cited by examiner

FIG. 3

Versus

Intermediate stage 'infrequent' & therefore can use beautiful/detailed scaling, versus rapid/cruder final or single stage scale.

= unused (released) blocks

= large numbers of physical memory copy operations

= physical memory MMU

FIG. 5A

Non-tiled fragmentation due to unpredictable contiguous block allocation requirements MMU block mis-matched, poorer re-allocation & cache consistency

FIG. 5B

Tiled fixed block size = fixed file size unlimited amount of fragmentation has no effect on usability
no copy operations required (for buffer re-centering Fig.24)
potential perfect synchronisation with MMU predictability
& extendibility of pool (!)

FIG. 7

SYSTEMS AND METHODS FOR GENERATING VISUAL REPRESENTATIONS OF GRAPHICAL DATA AND DIGITAL DOCUMENT PROCESSING

FIELD OF THE INVENTION

The invention relates to data processing methods and systems. More particularly, the invention relates to methods and systems for processing "graphical data" and "digital documents" (as defined herein) and to devices incorporating such methods and systems. In general terms, the invention is concerned with generating output representations of source data and documents; e.g. as a visual display or as hardcopy.

BACKGROUND TO THE INVENTION

As used herein, the terms "graphical data", "graphical object" and "digital document" are used to describe a digital representation of any type of data processed by a data processing system which is intended, ultimately, to be output in some form, in whole or in part, to a human user, typically by being displayed or reproduced visually (e.g. by means of a visual display unit or printer), or by text-to-speech conversion, etc. Such data, objects and documents may include any features capable of representation, including but not limited to the following: text; graphical images; animated graphical images; full motion video images; interactive icons, buttons, menus or hyperlinks. A digital document may also include non-visual elements such as audio (sound) elements. A digital document generally includes or consists of graphical data and/or at least one graphical object.

Data processing systems, such as personal computer systems, are typically required to process "digital documents", which may originate from any one of a number of local or remote sources and which may exist in any one of a wide variety of data formats ("file formats"). In order to generate an output version of the document, whether as a visual display or printed copy, for example, it is necessary for the computer system to interpret the original data file and to generate an output compatible with the relevant output device (e.g. monitor, or other visual display device, or printer). In general, this process will involve an application program adapted to interpret the data file, the operating system of the computer, a software "driver" specific to the desired output device and, in some cases (particularly for monitors or other visual display units), additional hardware in the form of an expansion card.

This conventional approach to the processing of digital documents in order to generate an output is inefficient in terms of hardware resources, software overheads and processing time, and is completely unsuitable for low power, portable data processing systems, including wireless telecommunication systems, or for low cost data processing systems such as network terminals, etc. Other problems are encountered in conventional digital document processing systems, including the need to configure multiple system components (including both hardware and software components) to interact in the desired manner, and inconsistencies in the processing of identical source material by different systems (e.g. differences in formatting, colour reproduction, etc). In addition, the conventional approach to digital document processing is unable to exploit the commonality and/or re-usability of file format components.

SUMMARY OF THE INVENTION

It is an object of the present invention to provide methods and systems for processing graphical data, graphical objects and digital documents, and devices incorporating such methods and systems, which obviate or mitigate the aforesaid disadvantages of conventional methods and systems.

The invention, in its various aspects, is defined in the claims appended hereto. Further aspects and features of the invention will be apparent from the following description.

In a first aspect, the invention relates to a method of redrawing a visual display of graphical data whereby a current display is replaced by an updated display, comprising, in response to a redraw request, immediately replacing the current display with a first approximate representation of the updated display, generating a final updated display, and replacing the approximate representation with the final updated display.

In a second aspect, the invention relates to a method of generating variable visual representations of graphical data, comprising dividing said graphical data into a plurality of bitmap tiles of fixed, predetermined size, storing said tiles in an indexed array and assembling a required visual representation of said graphical data from a selected set of said tiles.

The methods of said second aspect may be employed in methods of the first aspect.

A third aspect of the invention relates to a method of processing a digital document, said document comprising a plurality of graphical objects arranged on at least one page, comprising dividing said document into a plurality of zones and, for each zone, generating a list of objects contained within and overlapping said zone.

The methods of the second aspect may be employed in the methods of the third aspect.

In accordance with a fourth aspect of the invention, there is provided a digital document processing system adapted to implement the methods of any of the first to third aspects.

A preferred system in accordance with the fourth aspect of the invention comprises:

an input mechanism for receiving an input bytestream representing source data in one of a plurality of predetermined data formats;

an interpreting mechanism for interpreting said bytestream;

a converting mechanism for converting interpreted content from said bytestream into an internal representation data format; and a processing mechanism for processing said internal representation data so as to generate output representation data adapted to drive an output device.

In a further aspect, the invention relates to a graphical user interface for a data processing system in which interactive visual displays employed by the user interface are generated by means of a digital document processing system in accordance with the fourth aspect of the invention and to data processing systems incorporating such a graphical user interface.

In still further aspects, the invention relates to various types of device incorporating a digital document processing system in accordance with the fourth aspect of the invention, including hardware devices, data processing systems and peripheral devices.

Embodiments of the invention will now be described, by way of example only, with reference to the accompanying drawings.

DETAILED DESCRIPTION OF THE PREFERRED EMBODIMENTS

Figure 1:
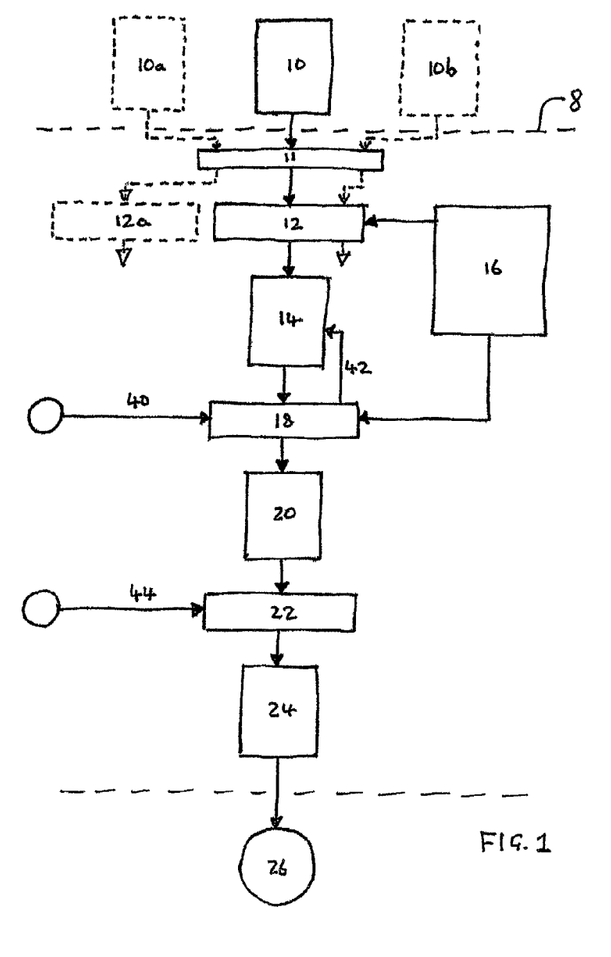
FIG. 1 is a block diagram illustrating an embodiment of a preferred digital document processing system which may be employed in implementing various aspects of the present invention.

Referring now to the drawings, FIG. 1 illustrates a preferred digital document processing system 8 in which the methods of the various aspects of the present invention may be implemented. Before describing the methods of the invention in detail, the system 8 will first be described by way of background. It will be understood that the methods of the present invention may be implemented in processing systems other than the system 8 as described herein.

In general terms, the system 8 will process one or more source documents 10 comprising data files in known formats. The input to the system 8 is a bytestream comprising the content of the source document. An input module 11 identifies the file format of the source document on the basis of any one of a variety of criteria, such as an explicit file-type identification within the document, from the file name (particularly the file name extension), or from known characteristics of the content of particular file types. The bytestream is input to a "document agent" 12, specific to the file format of the source document. The document agent 12 is adapted to interpret the incoming bytestream and to convert it into a standard format employed by the system 8, resulting in an internal representation 14 of the source data in a "native" format suitable for processing by the system 8. The system 8 will generally include a plurality of different document agents 12, each adapted to process one of a corresponding plurality of predetermined file formats.

The system 8 may also be applied to input received from an input device such as a digital camera or scanner. In this case the input bytestream may originate directly from the input device, rather than from a "source document" as such. However, the input bytestream will still be in a predictable data format suitable for processing by the system and, for the purposes of the system, input received from such an input device may be regarded as a "source document".

The document agent 12 employs a library 16 of standard objects to generate the internal representation 14, which describes the content of the source document in terms of a collection of generic objects whose types are as defined in the library 16, together with parameters defining the properties of specific instances of the various generic objects within the document. It will be understood that the internal representation may be saved/stored in a file format native to the system and that the range of possible source documents 10 input to the system 8 may include documents in the system's native file format. It is also possible for the internal representation 14 to be converted into any of a range of other file formats if required, using suitable conversion agents (not shown).

The generic objects employed in the internal representation 14 will typically include: text, bitmap graphics and vector graphics (which may or may not be animated and which may be two- or three-dimensional), video, audio, and a variety of types of interactive object such as buttons and icons. The parameters defining specific instances of generic objects will generally include dimensional co-ordinates defining the physical shape, size and location of the object and any relevant temporal data for defining objects whose properties vary with time (allowing the system to deal with dynamic document structures and/or display functions). For text objects, the parameters will normally also include a font and size to be applied to a character string. Object parameters may also define other properties, such as transparency.

The format of the internal representation 14 separates the "structure" (or "layout") of the documents, as described by the object types and their parameters, from the "content" of the various objects; e.g. the character string (content) of a text object is separated from the dimensional parameters of the object; the image data (content) of a graphic object is separated from its dimensional parameters. This allows document structures to be defined in a very compact manner and provides the option for content data to be stored remotely and to be fetched by the system only when needed.

The internal representation 14 describes the document and its constituent objects in terms of "high-level" descriptions.

The internal representation data 14 is input to a parsing and rendering module 18 which generates a context-specific representation 20 or "view" of the document represented by the internal representation 14. The required view may be of the whole document or of part(s) (subset(s)) thereof. The parser/renderer 18 receives view control inputs 40 which define the viewing context and any related temporal parameters of the specific document view which is to be generated. For example, the system may be required to generate a zoomed view of part of a document, and then to pan or scroll the zoomed view to display adjacent portions of the document. The view control inputs 40 are interpreted by the parser/renderer 18 in order to determine which parts of the internal representation are required for a particular view and how, when and for how long the view is to be displayed.

The context-specific representation/view 20 is expressed in terms of primitive shapes and parameters.

The parser/renderer 18 may also perform additional pre-processing functions on the relevant parts of the internal representation 14 when generating the required view 20 of the source document 10. The view representation 20 is input to a shape processor module 22 for final processing to generate a final output 24, in a format suitable for driving an output device 26 (or multiple output devices), such as a display device or printer.

The pre-processing functions of the parser/renderer 18 may include colour correction, resolution adjustment/enhancement and anti-aliasing. Resolution enhancement may comprise scaling functions which preserve the legibility of the content of objects when displayed or reproduced by the target output device. Resolution adjustment may be contextsensitive; e.g. the display resolution of particular objects may be reduced while the displayed document view is being panned or scrolled and increased when the document view is static (as described further below in relation to the first aspect of the invention).

There may be a feedback path 42 between the renderer/parser 18 and the internal representation 14; e.g. for the purpose of triggering an update of the content of the internal representation 14, such as in the case where the document 10 represented by the internal representation comprises a multi-frame animation.

The output representation 20 from the parser/renderer 18 expresses the document in terms of "primitive" objects. For each document object, the representation 20 preferably defines the object at least in terms of a physical, rectangular boundary box, the actual shape of the object bounded by the boundary box, the data content of the object, and its transparency.

The shape processor 22 interprets the representation 20 and converts it into an output frame format 24 appropriate to the target output device 26; e.g. a dot-map for a printer, vector instruction set for a plotter, or bitmap for a display device. An output control input 44 to the shape processor 22 defines the necessary parameters for the shape processor 22 to generate output 24 suitable for a particular output device 26.

The shape processor 22 preferably processes the objects defined by the view representation 20 in terms of "shape" (i.e. the outline shape of the object), "fill" (the data content of the object) and "alpha" (the transparency of the object), performs scaling and clipping appropriate to the required view and output device, and expresses the object in terms appropriate to the output device (typically in terms of pixels by scan conversion or the like, for most types of display device or printer).

The shape processor 22 preferably includes an edge buffer which defines the shape of an object in terms of scan-converted pixels, and preferably applies anti-aliasing to the outline shape. Anti-aliasing is preferably performed in a manner determined by the characteristics of the output device 26 (i.e. on the basis of the control input 44), by applying a grey-scale ramp across the object boundary. This approach enables memory efficient shape-clipping and shape-intersection processes.

A look-up table may be employed to define multiple tone response curves, allowing non-linear rendering control (gamma correction).

The individual objects processed by the shape processor 22 are combined in the composite output frame 24. The quality of the final output can also be controlled by the user via the output control input 44.

The shape processor 22 has a multi-stage pipeline architecture which lends itself to parallel processing of multiple objects, or of multiple documents, or of multiple subsets of one or more document, by using multiple instances of the shape processor pipeline. The pipeline architecture is also easily modified to include additional processing functions (e.g. filter functions) if required. Outputs from multiple shape processors 22 may generate multiple output frames 24 or may be combined in a single output frame 24.

The system architecture is modular in nature. This enables, for example, further document agents to be added as and when required, to deal with additional source file formats. The modular architecture also allows individual modules such as the library 16, parser/renderer 18 or shape processor 22 to be modified or upgraded without requiring changes to other modules.

The system architecture as a whole also lends itself to parallelism in whole or in part for simultaneous processing of multiple input documents 10*a*, 10*b* etc. or subsets of documents, in one or more file formats, via one or more document agents 12, 12*a*. The integrated, modular nature of the system allows multiple instances of system modules to be spawned within a data processing system or device as and when required, limited only by available processing and memory resources.

The potential for flexible parallelism provided by the system as a whole and the shape processor 22 in particular allows the display path for a given device to be optimised for available bandwidth and memory. Display updates and animations may be improved, being quicker and requiring less memory. The object/parameter document model employed is deterministic and consistent. The system is fully scalable and allows multiple instances of the system across multiple CPUs.

The parser/renderer 18 and shape processor 22 interact dynamically in response to view control inputs 40, in a manner which optimises the use of available memory and bandwidth. This applies particularly to re-draw functions when driving a visual display, e.g. when the display is being scrolled or panned by a user.

Firstly, the system may implement a scalable deferred re-draw model, in accordance with a first aspect of the invention, such that the display resolution of a document view, or of one or more objects within a view, varies dynamically according to the manner in which the display is to be modified. This might typically involve an object being displayed at reduced resolution whilst being moved on-screen and being displayed at full resolution when at rest. The system may employ multiple levels of display quality for this purpose. Typically, this will involve pre-built, low resolution bitmap representations of document objects and/or dynamically built and scaled bitmaps, with or without interpolation. This approach provides a highly responsive display which makes best use of available memory/bandwidth.

Figure 2A:
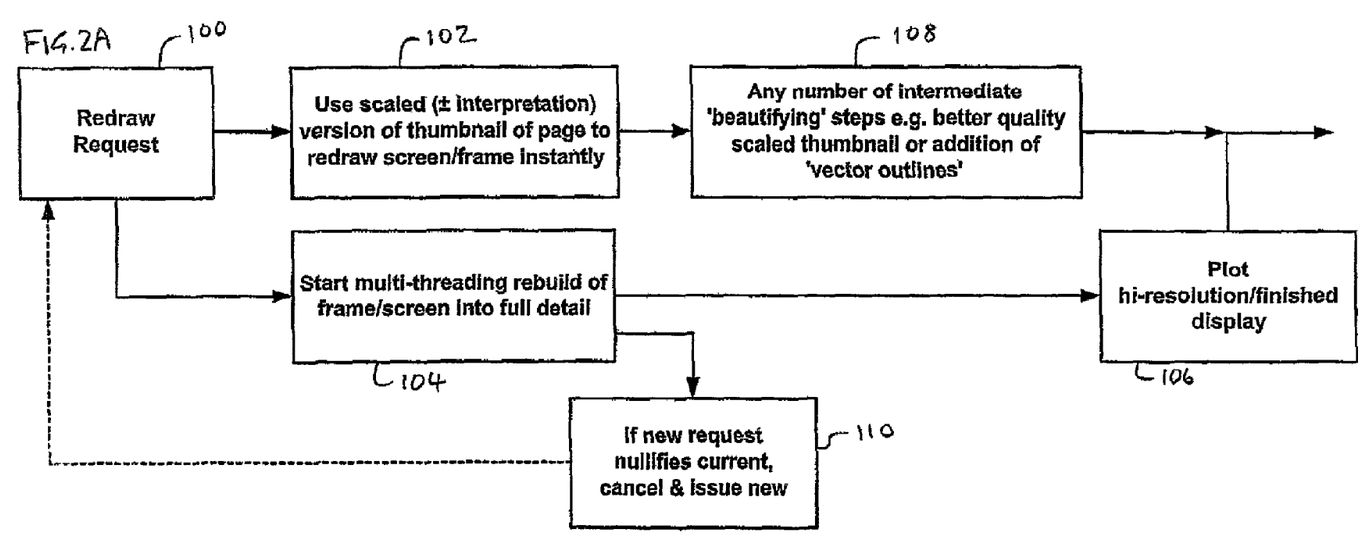
FIG. 2A is a flow diagram illustrating a first embodiment of a first aspect of the present invention.
Figure 2B:
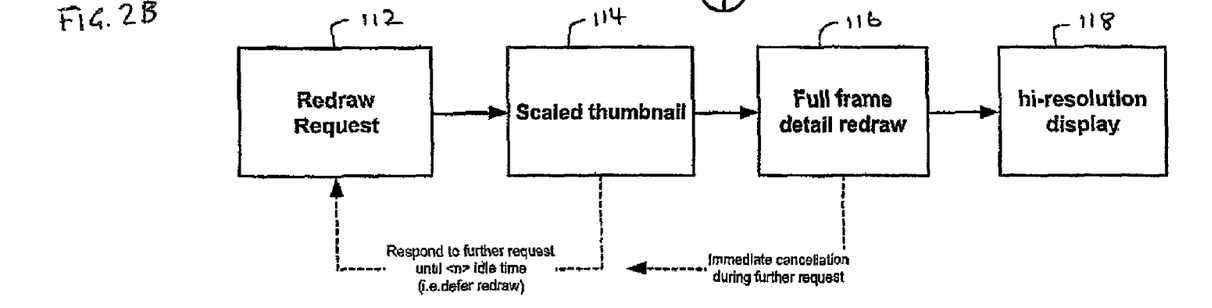
FIG. 2B is a flow diagram illustrating a second embodiment of a first aspect of the present invention.

Methods embodying this first aspect of the present invention are illustrated in FIGS. 2A and 2B.

When a redraw request is initiated within the system, it is necessary for all or part of the current frame to be re-rendered and displayed. The process of re-rendering the frame may take a significant amount of time.

Referring to FIG. 2A, when a redraw request 100 is initiated, the output frame is immediately updated (102) using one or more reduced resolution ("thumbnail") bitmap representations of the document or parts thereof which are scaled to approximate the required content of the redrawn display. In the system 8 of FIG. 1, the bitmap representation(s) employed for this purpose may be pre-built by the parser/renderer 18 and stored for use in response to redraw requests. This approximation of the redrawn display can be generated much more quickly than the full re-rendering of the display, providing a temporary display while re-rendering is completed. In the embodiment of FIG. 2A, the full re-rendering of the display (104) is performed in parallel with the approximate redraw 102, and replaces the temporary display once it is complete (106). The method may include one or more additional intermediate updates 108 of the approximate temporary display while the full re-rendering 104 is completed. These intermediate updates may progressively "beautify" the temporary display (i.e. provide successively better approximations of the final display); e.g. by using better quality scaled bitmaps and/or by superimposing vector outlines of objects on the bitmap(s).

The method of FIG. 2A also allows the redraw process to be interrupted by a new redraw request (110). The full re-rendering process 104 can simply be halted and the system processes the new redraw request as before.

FIG. 2B illustrates an alternative embodiment in which a redraw request 112 is followed by an approximate thumbnail-based redraw 114 as before, and the full frame redraw 116 follows in series after the approximate redraw (instead of in parallel as in FIG. 2A) to generate the final full resolution display 118. This process may also be interrupted at any stage by a new redraw request.

The methods of FIGS. 2A and 2B may be applied to all types of redraw requests, including screen re-builds, scrolling, panning and scaling (zooming).

Figure 3:
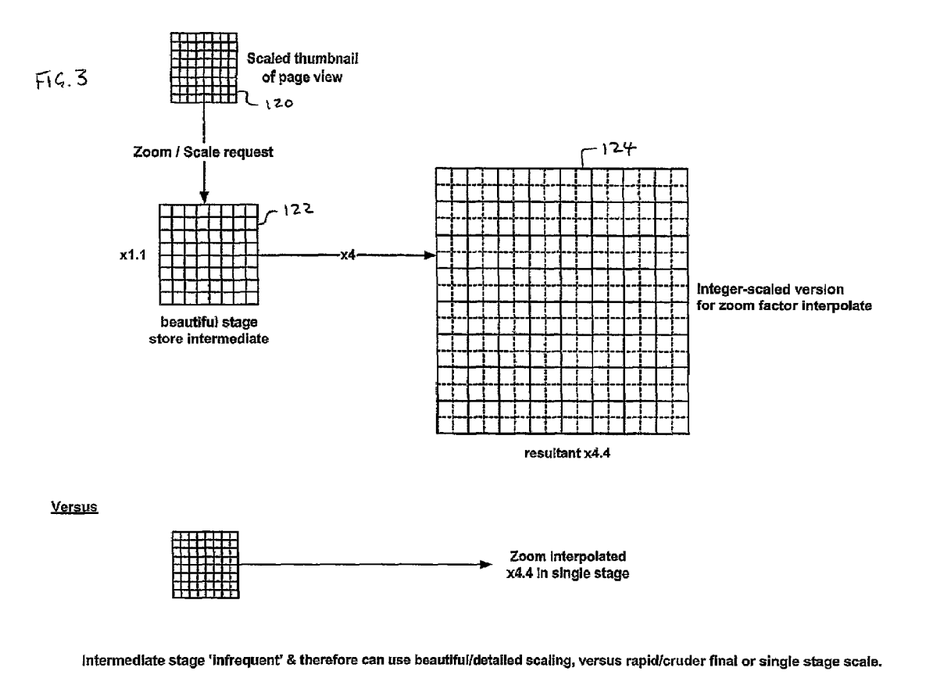
FIG. 3 is a diagram illustrating a method of scaling a bitmap in a preferred embodiment of the first aspect of the invention.

FIG. 3 illustrates a preferred method of zooming/scaling a thumbnail bitmap. A basic bitmap 120 is created and stored by the system at some previous stage of document processing as previously described. Assuming that the bitmap is required to be scaled by some arbitrary factor (e.g. by a factor 4.4), the basic thumbnail 120 is scaled in two stages: first, the thumbnail is scaled by a fractional amount (122) corresponding to the final scaling factor divided by the whole number part thereof (4.4 divided by 4 equals 1.1 in this example), and then by an integer amount (124) corresponding to the whole number part of the final scaling factor (i.e. ×4 in this example). This is faster than a single stage zoom of 4.4, at the expense of a small increase in memory requirement.

The scaling operations described above may be performed with or without interpolation. FIG. 3 shows the final zoomed bitmap 124 interpolated to provide a resolution of 16×16 as compared with the original 8×8 bitmap 120. Interpolation may be performed using any of a variety of well known interpolation methods.

Figure 4A:
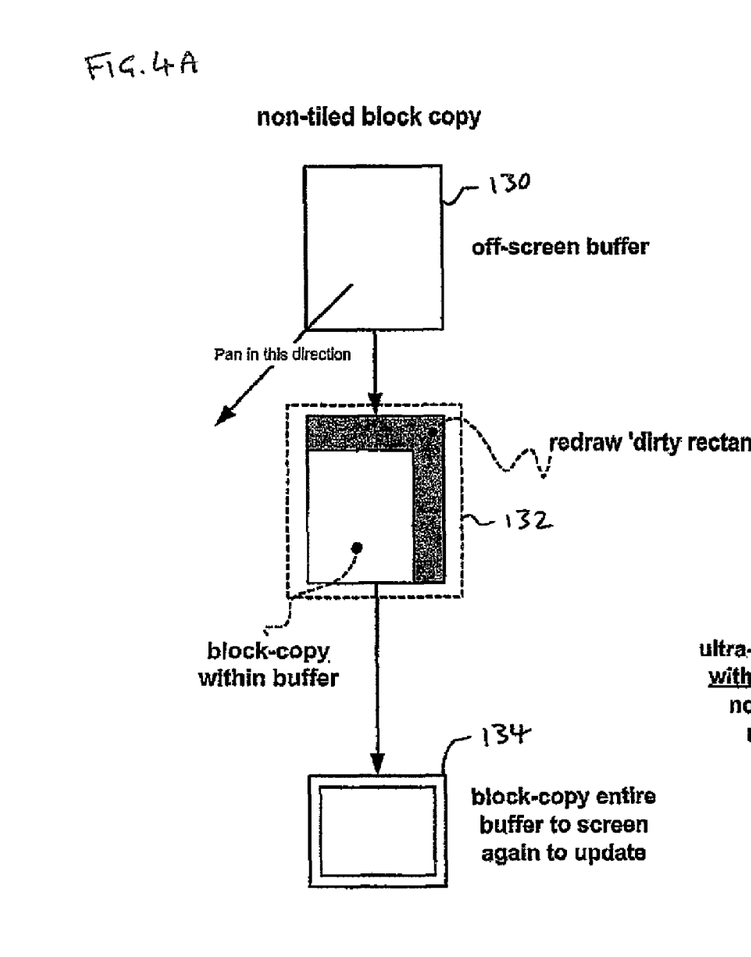
FIG. 4A is a diagram illustrating a conventional method of using an off-screen buffer for panning a visual display of a digital document.

The ability to process transparent objects is a significant feature of the system of FIG. 1. However, this necessitates the use of off-screen buffering in the shape processor 22 in order to assemble a final output frame. Typically, as shown in FIG. 4A, a conventional off-screen buffer 130 will cover an area larger than the immediate display area, allowing a limited degree of panning/scrolling within the buffer area, but the entire buffer has to be re-centred and re-built when the required display moves outwith these limits. This requires a block-copy operation within the buffer and redrawing of the remaining "dirty rectangle" (132) before block-copying the updated buffer contents to the screen 134.

Figure 4B:
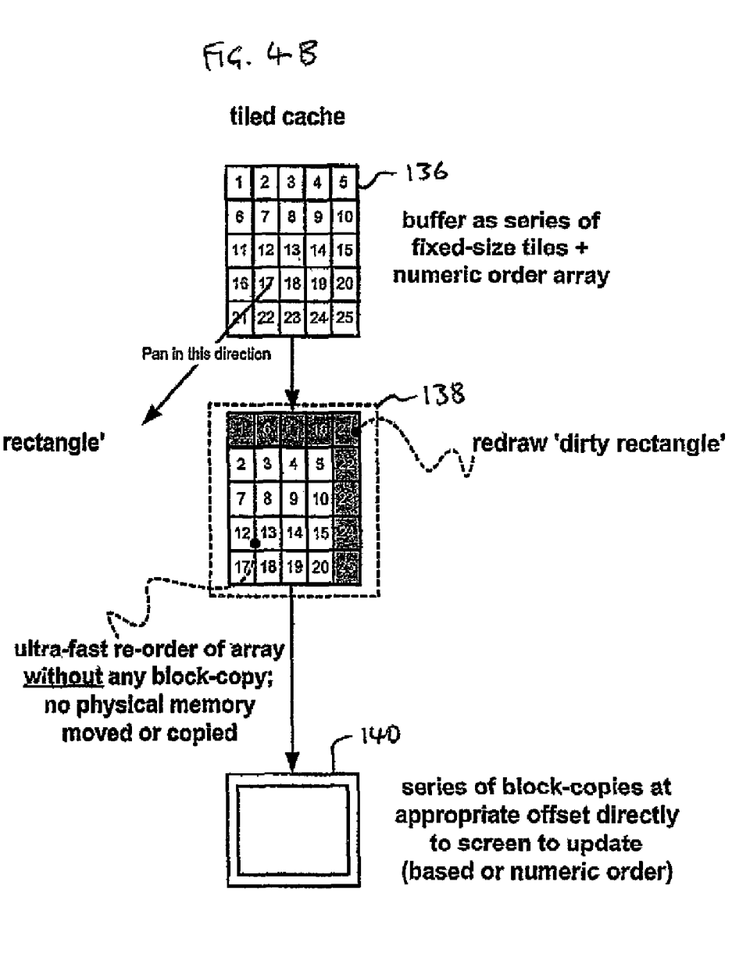
FIG. 4B is a diagram illustrating a method of using an off-screen buffer for panning a visual display of a digital document in accordance with a second aspect of the present invention.

In accordance with a second aspect of the present invention, as illustrated in FIG. 4B, the efficiency of such buffering processes is improved by defining the buffer content as an array of tiles 136, indexed in an ordered list. Each tile comprises a bitmap of fixed size (e.g. 32×32 or 64×64) and may be regarded as a "mini-buffer". When the required display view moves outwith the buffer area, it is then only necessary to discard those tiles which are no longer required, build new tiles to cover the new area of the display and update the tile list (138). This is faster and more efficient than conventional buffering processes, since no block-copying is required within the buffer and no physical memory is required to be moved or copied.

The tiling scheme described may be used globally to provide a tilepool for all document and screen redraw operations. The tiles are used to cache the document(s) off-screen and allow rapid, efficient panning and re-centering of views.

Figure 5A:
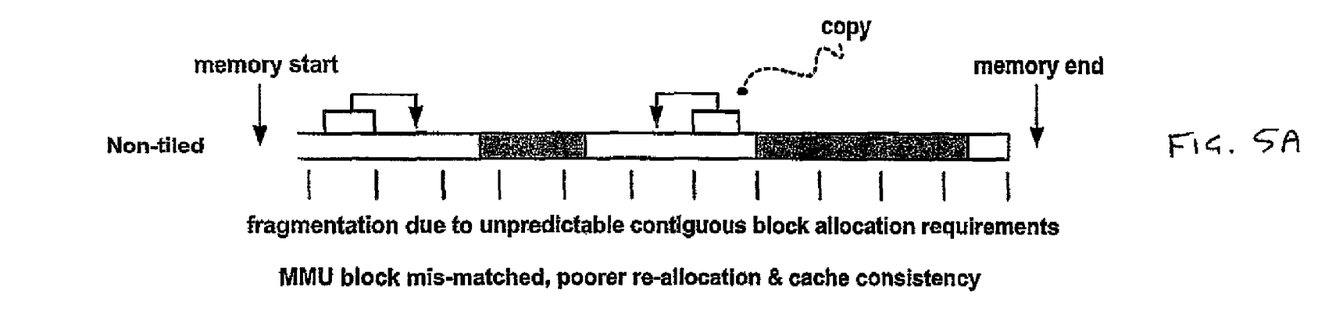
FIG. 5A is a diagram illustrating memory allocation and fragmentation associated with the conventional method of FIG. 4A.
Figure 5B:
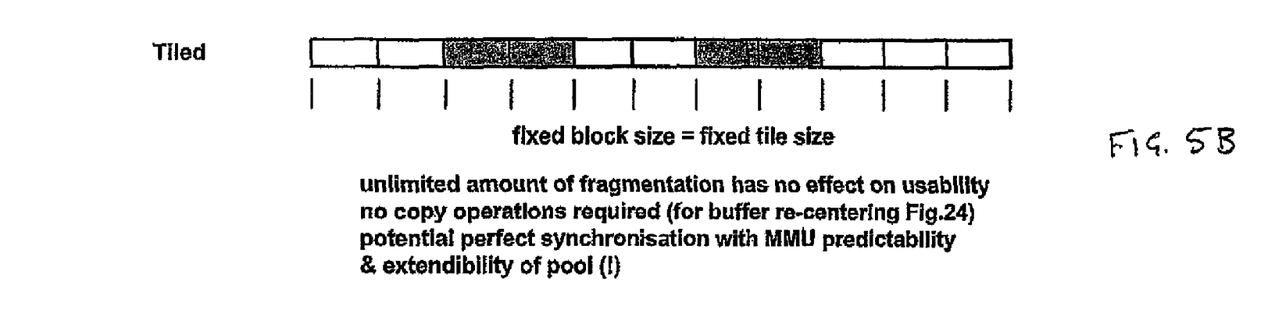
FIG. 5B is a diagram illustrating memory allocation and fragmentation associated with the method of FIG. 4B.

The use of a tilepool as described also allows for more efficient usage of memory and processor resources. FIG. 5A shows how conventional off-screen buffering methods, involving data blocks which have arbitrary, unpredictable sizes, result in the fragmentation of memory due to unpredictable contiguous block allocation requirements. Blocks of memory required by buffering operations are mismatched with processor memory management unit (MMU) blocks, so that re-allocation of memory becomes inefficient, requiring large numbers of physical memory copy operations, and cache consistency is impaired. By using tiles of fixed, predetermined size, memory requirements become much more predictable, so that memory and processor resources may be used and managed much more efficiently, fragmentation may be unlimited without affecting usability and the need for memory copy operations may be substantially eliminated for many types of buffering operations. Ideally, the tile size is selected to correspond with the processor MMU block size.

Figure 5C:
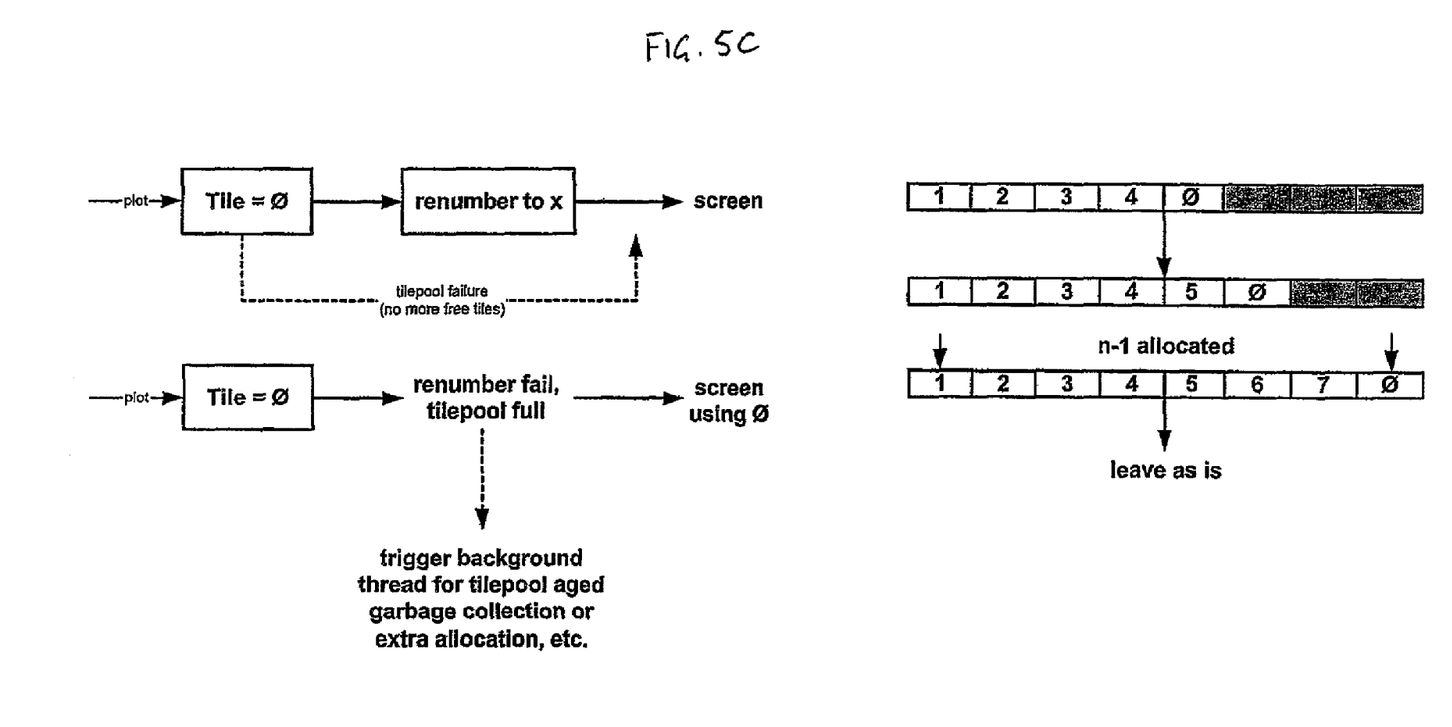
FIG. 5C is a diagram illustrating a preferred method of implementing the method of FIG. 4B.

FIG. 5C illustrates a preferred scheme for managing tiles within the tilepool. Tile number zero is always reserved for building each new tile. Once a new tile has been built, it is re-numbered using the next available free number (i.e. where the tilepool can accommodate a maximum of n tiles the number of tile addresses allocated is restricted to n−1). In the event of a tilepool renumbering failure, when the tilepool is full and there are no more free tiles, the new tile 0 is written directly to screen and a background process (thread) is initiated for garbage collection (e.g. identification and removal of "aged" tiles) and/or allocation of extra tile addresses. This provides an adaptive mechanism for dealing with resource-allocation failures.

Figure 6:
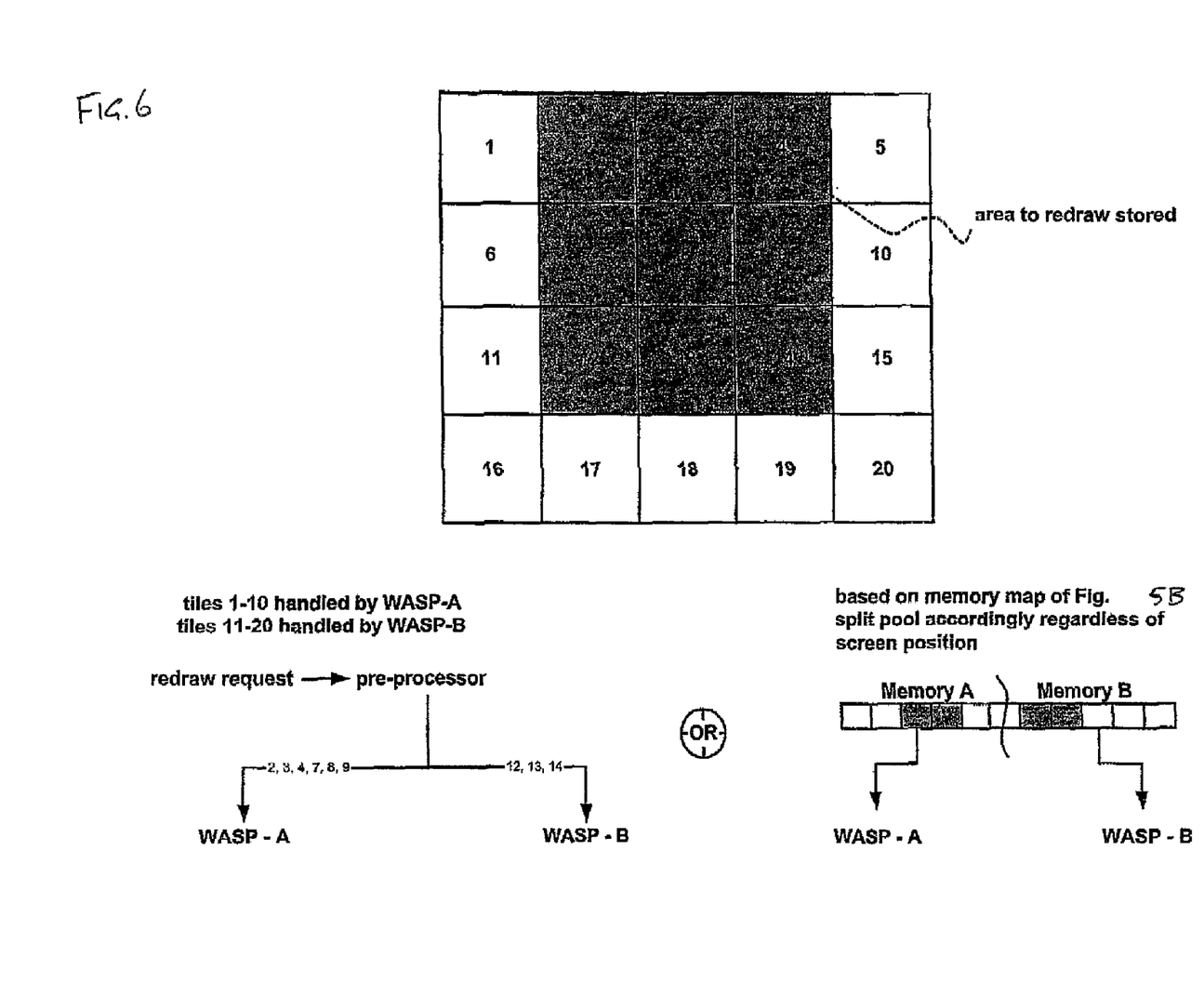
FIG. 6 is a diagram illustrating the use of multiple parallel processor modules for implementing the method of FIG. 4B.

The tiling scheme described lends itself to parallel processing, as illustrated in FIG. 6. Processing of a set of tiles can be divided between multiple parallel processes (e.g. between multiple instances of the shape processor 22 of FIG. 1). For example, a set of tiles 1–20 can be divided based on the screen positions of the tiles so that the processing of tiles 1–10 is handled by one processor WASP-A and the processing of tiles 11–20 is handled by a second processor WASP-B. Accordingly, if a redraw instruction requires tiles 1–3, 7–9 and 12–14 to be redrawn, tiles 2–4 and 7–9 are handled by WASP-A and tiles 12–14 by WASP-B. Alternatively, the set of tiles can be divided based on the location of the tiles in a tile memory map, dividing the tile memory into memory A for processing by WASP-A and memory B for processing by WASP-B.

The tiling scheme described facilitates the use of multiple buffering and off-screen caching. It also facilitates interruptable re-draw functions (e.g. so that a current re-draw may be interrupted and a new re-draw initiated in response to user input), efficient colour/display conversion and dithering, fast 90 degree (portrait/landscape) rotation of whole display in software, and reduces the redraw memory required for individual objects. Tiling also makes interpolated bitmap scaling faster and more efficient. It will also be appreciated that a system such as that of FIG. 1 may employ a common tilepool for all operating system/GUI and application display functions of a data processing system.

It will be understood that the tiling methods of the second aspect of the invention may advantageously be combined with the redraw methods of the first aspect of the invention.

Figure 7:
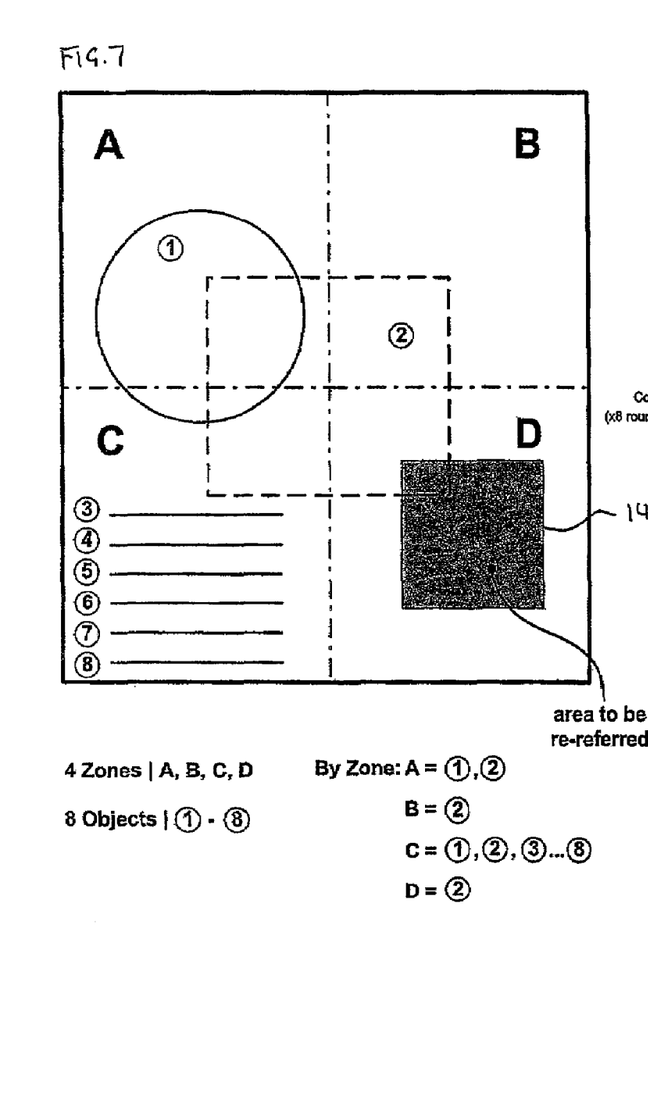
FIGS. 7 and 8 are diagrams illustrating a method of processing a digital document in accordance with a third aspect of the invention.

In accordance with a third aspect of the present invention, the processing of a document involves dividing each page of the document to be viewed into zones (this would involve interaction of the renderer/parser 18 and shape processor 22 in the system 8 of FIG. 1), as illustrated in FIG. 7. Each zone A, B, C, D has associated with it a list of all objects 1–8 contained within or overlapping that zone. Re-draws can then be processed on the basis of the zones, so that the system need only process objects associated with the relevant zones affected by the re-draw. This approach facilitates parallel processing and improves efficiency and reduces redundancy. The use of zones also facilitates the use of the system to generate different outputs for different display devices (e.g. for generating a composite/mosaic output for display by an array of separate display screens).

Figure 8:
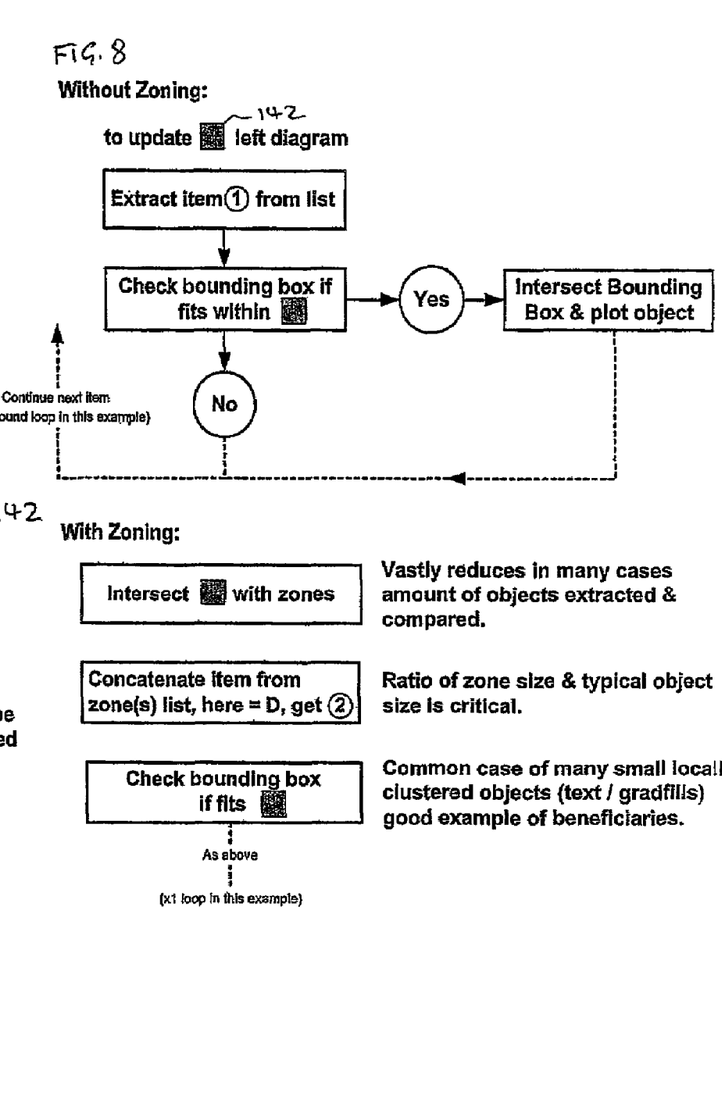

As illustrated in FIG. 8, without the use of zoning, any screen update relating to the shaded area 142 would require each of the eight objects 1 to 8 to be checked to see whether the bounding box of the object intersects the area 142 in order to determine whether that object needs to be plotted. With zoning, it is possible to determine firstly which zones intersect the area 142 (zone D only in this example), secondly, which objects intersect the relevant zone(s) (object 2 only in this case), and then it is only necessary to check whether the bounding boxes of those objects which intersect the relevant zone(s) also intersect the area 142. In many cases, this will greatly reduce the overhead involved in extracting and comparing objects with the area 142 of interest.

It will be appreciated that zoning of this type may be of little or no benefit in some circumstances (e.g. in the extreme case where all objects on a page intersect all zones of the page); the relationship between the zone size and the typical object size may be significant in this respect. For the purposes of determining the nature of any zoning applied to a particular page, an algorithm may be employed to analyse the page content and to determine a zoning scheme (the number, size and shape of zones) which might usefully be employed for that page. However, for typical page content, which will commonly include many small, locally clustered objects, an arbitrary division of the page into zones is likely to yield significant benefits.

The zoning and tiling schemes described above are independent in principle but may be combined advantageously; i.e. zones may correlate with one or more tiles. Again this facilitates parallelism and optimises use of system resources.

Referring again to FIG. 1, the system preferably employs a device-independent colour model, suitably a luminance/chrominance model such as the CIE L*a*b* 1976 model. This reduces redundancy in graphic objects, improves data compressibility and improves consistency of colour output between different output devices. Device-dependent colour correction can be applied on the basis of the device-dependent control input 44 to the shape processor 22.

FIG. 1 shows the system having an input end at which the source bytestream is received and an output end where the final output frame 24 is output from the system. However, it will be understood that the system may include intermediate inputs and outputs at other intermediate stages, such as for fetching data content or for saving/converting data generated in the course of the process.

Digital document processing systems in accordance with the fourth aspect of the present invention may be incorporated into a variety of types of data processing systems and devices, and into peripheral devices, in a number of different ways.

In a general purpose data processing system (the "host system"), the system of the present invention may be incorporated alongside the operating system and applications of the host system or may be incorporated fully or partially into the host operating system.

For example, the system of the present invention enables rapid display of a variety of types of data files on portable data processing devices with LCD displays without requiring the use of browsers or application programs. This class of data processing devices requires small size, low power processors for portability. Typically, this requires the use of advanced RISC-type core processors designed into ASICs (application specific integrated circuits), in order that the electronics package is as small and highly integrated as possible. This type of device also has limited random access memory and typically has no non-volatile data store (e.g. hard disk). Conventional operating system models, such as are employed in standard desktop computing systems (PCs), require high powered central processors and large amounts of memory in order to process digital documents and generate useful output, and are entirely unsuited for this type of data processing device. In particular, conventional systems do not provide for the processing of multiple file formats in an integrated manner. By contrast, the present invention may utilise common processes and pipelines for all file formats, thereby providing a highly integrated document processing system which is extremely efficient in terms of power consumption and usage of system resources.

The system of the present invention may be integrated at the BIOS level of portable data processing devices to enable document processing and output with much lower overheads than conventional system models. Alternatively, the invention may be implemented at the lowest system level just above the transport protocol stack. For example, the system may be incorporated into a network device (card) or system, to provide in-line processing of network traffic (e.g. working at the packet level in a TCP/IP system).

In a particular device, the system of the invention is configured to operate with a predetermined set of data file formats and particular output devices; e.g. the visual display unit of the device and/or at least one type of printer.

Examples of portable data processing devices which may employ the present system include "palmtop" computers, portable digital assistants (PDAs, including tablet-type PDAs in which the primary user interface comprises a graphical display with which the user interacts directly by means of a stylus device), internet-enabled mobile telephones and other communications devices, etc.

The system may also be incorporated into low cost data processing terminals such as enhanced telephones and "thin" network client terminals (e.g. network terminals with limited local processing and storage resources), and "set-top boxes" for use in interactive/internet-enabled cable TV systems.

When integrated with the operating system of a data processing system, the system of the present invention may also form the basis of a novel graphical user interface (GUI) for the operating system (OS). Documents processed and displayed by the system may include interactive features such as menus, buttons, icons etc. which provide the user interface to the underlying functions of the operating system. By extension, a complete OS/GUI may be expressed, processed and displayed in terms of system "documents". The OS/GUI could comprise a single document with multiple "chapters".

The system of the present invention may also be incorporated into peripheral devices such as hardcopy devices (printers and plotters), display devices (such as digital projectors), networking devices, input devices (cameras, scanners etc.) and also multi-function peripherals (MFPs).

When incorporated into a printer, the system may enable the printer to receive raw data files from the host data processing system and to reproduce the content of the original data file correctly, without the need for particular applications or drivers provided by the host system. This avoids the need to configure a computer system to drive a particular type of printer. The present system may directly generate a dot-mapped image of the source document suitable for output by the printer (this is true whether the system is incorporated into the printer itself or into the host system). Similar considerations apply to other hardcopy devices such as plotters.

When incorporated into a display device, such as a projector, the system may again enable the device to display the content of the original data file correctly without the use of applications or drivers on the host system, and without the need for specific configuration of the host system and/or display device. Peripheral devices of these types, when equipped with the present system, may receive and output data files from any source, via any type of data communications network.

From the foregoing, it will be understood that the system of the present invention may be "hard-wired"; e.g. implemented in ROM and/or integrated into ASICs or other single-chip systems, or may be implemented as firmware (programmable ROM such as flashable ePROM), or as software, being stored locally or remotely and being fetched and executed as required by a particular device.

Improvements and modifications may be incorporated without departing from the scope of the present invention.

What is claimed is:

1. A method of redrawing a visual display of graphical data whereby a current display of the graphical data is replaced by an updated display of the graphical data, comprising,
   receiving a request for an updated display of the graphical data;
   storing a reduced resolution bitmap representation of the graphical data distinct from the current display;
   in response to the request, replacing the current display with a first approximate representation of the requested updated display, wherein said first approximate representation includes a scaled version of the stored distinct reduced resolution bitmap representation of said graphical data,
   generating a final updated display, and
   replacing the approximate representation with the final updated display.

2. A method as claimed in claim 1, wherein the replacing of the approximate representation include replacing said first approximate representation with one or more successive improved approximate representations of the requested updated display before displaying the final updated display.

3. A method as claimed in claim 2, wherein a subsequent improved approximate representation comprises said scaled version of the distinct reduced resolution bitmap representation of said graphical data with vector outlines superimposed thereon.

4. A method as claimed in claim 1, wherein the replacement of the current display by said first and any subsequent approximate representations is performed in parallel with generating said final updated display.

5. A method as claimed in claim 1, further comprising generating variable visual representations of the graphical data, by dividing the graphical data into a plurality of bitmap tiles of fixed size, storing said tiles in an indexed array and assembling a visual representation of the graphical data from a selected set of said tiles.

6. A method as claimed in claim 5, wherein a current visual representation of said graphical data is updated by removing redundant tiles from said selected set and adding new tiles to said selected set.

7. A method as claimed in claim 6, wherein said multiple sources include applications running on a data processing system and an operating system of said data processing system.

8. A method according to claim 6, comprising the further step of updating the indexing of said array to remap files in the array to locations on the display.

9. A method as claimed in claim 5 wherein said array of tiles represents graphical data from multiple sources.

10. A method as claimed in claim 5, including processing subsets of said tiles in parallel.

11. A method as claimed in claim 5 wherein said tiles are assembled into a visual display, such that a current display is replaced by an updated display, comprising a first approximate representation of the updated display.

12. A method as claimed in claim 1, wherein the graphical data corresponds to a digital document composed of a plurality of graphical objects arranged on at least one page, further comprising:
    dividing said document into a plurality of zones; and
    for each zone, generating a list of objects contained within and overlapping said zone.

13. A method as claimed in claim 12, wherein a visual representation of a part of said document is generated by determining which of said zones intersect said part of said document, determining a set of said listed objects associated with said intersecting zones that are contained within or overlap said part of said document, and processing said set of listed objects to generate said visual representation.

14. A method as claimed in claim 12, wherein visual representations of said document are generated having a current display be replaced by an updated display, comprising a first approximate representation of the updated display.

15. A method as claimed in claim 12, further comprising dividing the graphical data into a plurality of bitmap tiles of fixed size, storing said tiles in an indexed array and assembling the visual representation of said graphical data from a selected set of said tiles wherein each of said zones corresponds to at least one of said tiles.

16. A method of claim 1, wherein a display of a bitmap is updated by scaling the bitmap from a first resolution to a second resolution using interpolation.

17. A method as claimed in claim 1 wherein the stored distinct reduced resolution bitmap representation of the graphical data is generated and stored prior to the redraw request.

18. A method as claimed in claim 17 wherein replacing the current display with the first approximate representation of the updated display further comprises increasing the size of the stored distinct reduced resolution representation of the graphical data by a scaling factor while maintaining the resolution of the first approximate representation, thereby generating the scaled version of the distinct reduced resolution bitmap representation.

19. A method as claimed in claim 1, wherein the visual display includes a first image and wherein the updated display includes a second image.

20. A method as claimed in claim 19, wherein the second image is a modified version of the first image.

21. A method according to claim 1 wherein the requested updated display is a zoomed-in version of the current visual display.

22. A method according to claim 1 wherein the requested updated display is a zoomed-out version of the current visual display.

23. A method according to claim 1 wherein the position of the requested updated display on a display screen is different than the location of the current display on the display screen.

24. A method according to claim 1 wherein the graphical data corresponds to a rendering of a part of a digital document and wherein the requested updated display corresponds to a rendering of a different part of the digital document.

25. A handheld device having a graphical interface capable of redrawing graphical data, comprising
- a display memory for storing data representative of document currently being displayed on the handheld device,
- a second memory for storing a distinct reduced resolution bitmap representation of said document being displayed, and
- a module capable of detecting an instruction to generate an undated display of the document, the instruction including an alteration to an aspect of the document being displayed, and in response thereto replacing the current display of the document with a sealed version of the stored distinct reduced resolution bitmap representation of the document, generating a final updated display of the document, and replacing the scaled version of the distinct reduced resolution bitmap representation of the document with the final updated display of the document.

26. A device according to claim 25, further comprising
a processor for replacing a displayed scaled version of the distinct reduced resolution bitmap representation of the document with one or more improved reduced resolution bitmap representations the updated display of the document.

27. A device according to claim 25, further including a processor for:
- generating variable visual representations of graphical data;
- dividing graphical data into a plurality of bitmap tiles of fixed size;
- storing said tiles in an indexed array; and
- assembling a visual representation of said graphical data from a selected set of said tiles.

28. A handheld device according to claim 25 wherein the updated display is a zoomed-in version of the current visual display.

29. A handheld device according to claim 25 wherein the updated display is a zoomed-out version of the current visual display.

30. A handheld device according to claim 25 wherein the position of the updated display on a display screen is different than the location of the current display on the display screen.

31. A handheld device according to claim 25 wherein the graphical data corresponds to a rendering of a part of the digital document and wherein the requested updated display corresponds to a rendering of a different part of the digital document.

* * * * *